Dec. 8, 1970   M. COLOMBIE ET AL   3,545,966
MANUFACTURE OF IMPROVED NUCLEAR FUELS
Filed Feb. 27, 1968   4 Sheets-Sheet 1
Fig. 1
Fig. 2
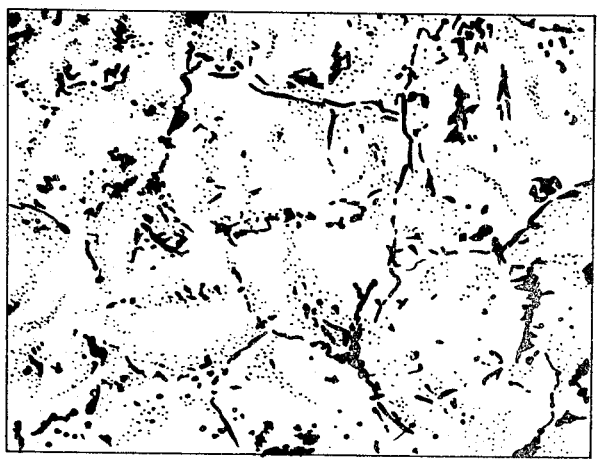
Fig. 3
INVENTORS
MICHEL COLOMBIE
BY   MICHEL FOURE
Bauer and Seymour
ATTORNEYS Dec. 8, 1970   M. COLOMBIE ET AL   3,545,966
MANUFACTURE OF IMPROVED NUCLEAR FUELS
Filed Feb. 27, 1968   4 Sheets-Sheet 2

INVENTORS
MICHEL COLOMBIE
BY   MICHEL FOURE

Bauer and Seymour
ATTORNEYS

INVENTORS
MICHEL COLOMBIE
MICHEL FOURE
BY
ATTORNEYS

Fig. 9
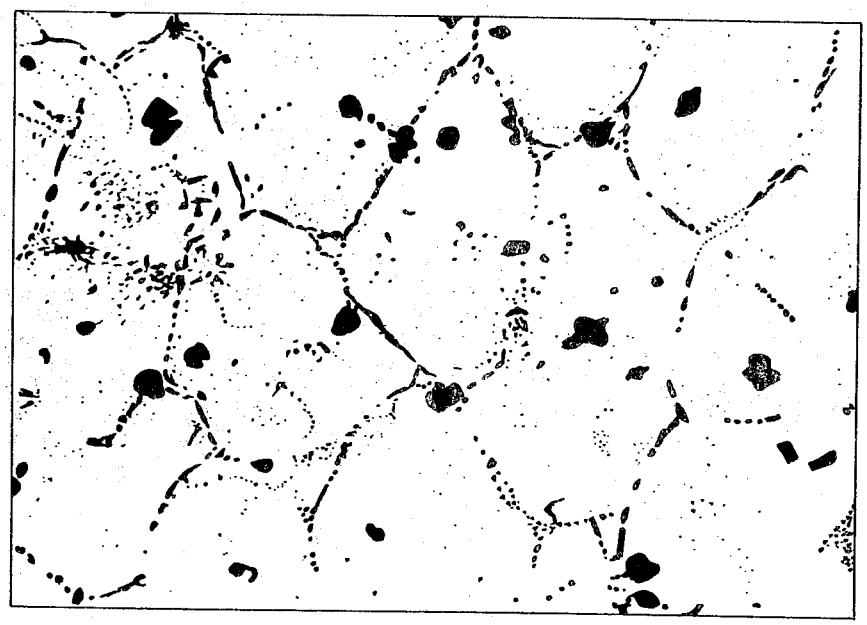
Fig. 10
INVENTORS
MICHEL COLOMBIE
MICHEL FOURE

United States Patent Office 3,545,966
Patented Dec. 8, 1970

3,545,966
MANUFACTURE OF IMPROVED NUCLEAR FUELS
Michel Colombie, Champigny, and Michel Foure, Romans-sur-Isere, France, assignors to Compagnie pour l'Etude la Realisation de Combustibles Atomiques (C.E.R.C.A.), Paris, France
Continuation-in-part of application Ser. No. 544,897, Apr. 25, 1966. This application Feb. 27, 1968, Ser. No. 708,692
Int. Cl. C22b 61/04
U.S. Cl. 75—122.7                                       18 Claims

ABSTRACT OF THE DISCLOSURE

Fine grained nuclear fuels having stable dimensions under working conditions in nuclear reactors are made from uranium and its alloys with metals such as molybdenum, chromium, silicon and germanium by alloying it with small amounts of boron and beryllium by a process which involves controlled cooling in a particular temperature range. Advantages are secured by multiplying the number of grains per unit volume in the fuel.

---

Figure 4:
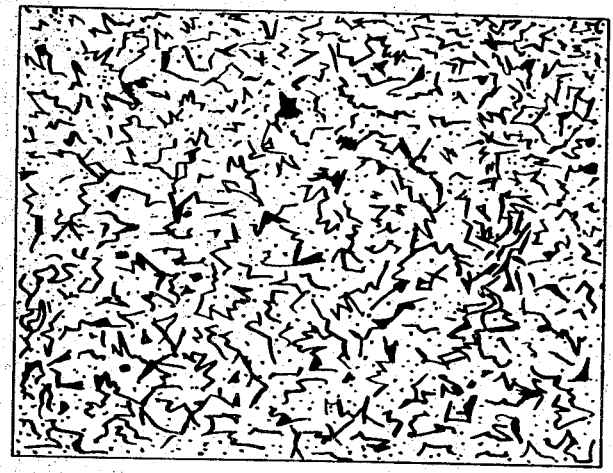

This invention relates to nuclear fuels containing uranium as the essential fissionable element, and to methods and compositions of matter useful in their manufacture. This invention is a continuation-in-part of the application identified as Ser. No. 544,897 filed Apr. 25, 1966 by the same inventors and is entitled to the filing date of that case as to all common subject matter, and to its priority, now abandoned.

Nuclear fuels undergo severe conditions and it is the endeavor of manufacturers to incorporate qualities which satisfy the needs of service. The standards, for fuel, seldom approached in practice, require:

(a) High specific power. This permits the construction of smaller, less costly reactors for a given output, and a reduction in the investment in uranium and apparatus;

(b) Minor fragmentation. This simplifies the servicing of the reactor, reduces the periods of idleness during servicing, and reduces the cost of making the fuel and the reactor by incorporating the charge in larger and fewer elements;

(c) Good mechanical strength and resistance to distortion at high temperature, especially in the case of tubes which have exterior cooling and must support the pressure of the refrigerant;

(d) Dimensional stability under radiation or under thermal cycling. Fuels having large grains in the internal structure do not qualify. The crystal structure of uranium is a rectangular parallelopiped, the sides of which do not respond equally when atoms produced by fission enter the pattern, one elongates, another contracts, and a third is unchanged. The larger the crystal the worse the distortion.

(e) Good resistance to cavitation, the decohesion of the uranium under bombardment.

(f) Low neutronic absorption.

(g) Low cost.

It has been excessively difficult to improve all of these qualities at once because the factors which improve one category may degrade another. For example, in a certain type of reactor solid bars of uranium were used but performance under (a) and (b) were low. By substituting tubes for the bars those categories were improved but (c) was not. By incorporating .2–.4 Mo in the alloy (c) was improved but only coarse grains were present and (d) was not satisfied. Increasing Mo to 1.1% left (e) and (f) unsatisfied and (c) still poor. The total effort improved specific power but reduced the quantity of energy that could be made available.

It is known that pure uranium is not perfectly suited to the manufacture of combustible elements for nuclear reactors, especially when such elements must have precise and stable dimensions. Under the impact of irradiation and successive heatings and coolings, uranium undergoes substantial deformation. It has been proposed to improve the resistance of uranium to the conditions encountered in use in a reactor by incorporating certain additive elements, and numerous alloys have been made which may be shaped as combustible elements capable of sustaining considerable quantities of radiation. Some of those alloys contain substantial quantities of the addition products and, as a consequence, are not wholly satisfactory for the manufacture of combustible elements for natural uranium reactors, as such reactors do not work well except with fuels that contain but little alloying material.

The alloys of uranium and molybdenum have heretofore beten studied and have provided good results, particularly as to the dimensions of the gamma phase which is obtained when the molten metal is rapidly solidified. It is thought, in effect, that the structure of the gamma grains establishes the structure of the grains which are finally produced, notably the size and shape of the alpha pseudo-grains. Such alloys are much employed, especially alloys containing from 1 to 4 percent of molybdenum, but to give existence to a sufficiently fine gamma grain such alloys must bet cooled rapidly in the region of solidification, for example at 80° C. per minute, which is accomplished by casting them into cold molds. Such rapid cooling has heretofore had the difficulties of producing imperfect pieces containing foundry defects such as pits, voids, and shrinkage holes. Such defects are important when strong pieces, capable of resisting substantial mechanical forces, must be produced directly from the foundry. This is the case for tubular fuels, closed at their ends, of which the inside and outside are at substantial pressure differences during use in the reactor.

The objects of the invention are to impart to uranium and its alloys an internal structure capable of maintaining precise and stable dimensions during use as a nuclear fuel. The invention involves a mixture of raw materials capable of producing the novel product, a process by which the product is produced from the mixture, and the product. In order that the invention be understood, a brief review of the status of the art is provided.

It is also an object of the invention to overcome the difficulties hereinbefore stated, especially those found in paragraphs (a) to (g).

The objects of the invention are accomplished generally speaking by a mixture, and a process which produce from uranium and its alloys with known grain fining elements such as molybdenum and with inert metals such as aluminum, copper, nickel and tin a novel product which has fine grains in the phase which is stable at room temperature, and which is derived from the primary structure, and which is obtainable through a wide range of cooling speeds between the temperature of solidification and the temperature corresponding to the existence of the phase which is stable at room temperature, and which is operative at low cooling speeds as distinguished from the high speeds which were necessary to the prior art. This invention is characterized by the fact that uranium and its alloys receive the addition of very small amounts, between about 5 and about 2,000 parts per million of boron, beryllium, or both. The uranium or its alloy may also be alloyed with one or more elements which are known to refine the alpha grain structure but in this case only for a more limited range of cooling speeds. It may also be alloyed with inert metals without inhibiting the effect of boron or beryllium on the uranium.

The invention also has as an object the manufacture of combustible fuels for nuclear reactors in all shapes and sizes by molding. Other objects are to prepare uranium alloys of smaller grain and greater strength by pouring the melt directly into the shaping mold.

Although prior research has sought to refine uranium fuel with alloying elements, the attempts have not had success except in limited degree and with few alloying elements. When we use the term fining metals in referring to prior art elements such as molybdenum, we mean only that they were proposed to ameliorate known imperfections, not that they accomplished the amelioration. For instance, alloys of uranium and silicon (.1% Si), uranium with molybdenum (.4% Mo) aluminum (500 parts per million) silicon (500 parts per million), and uranium with Cr (.1% Cr) cannot be satisfactorily refined by prior methods but only by the present invention. The present method is of general application, producing a multiplicity of grains per unit volume, compared to the same uranium fuels without boron or beryllium, developing superior qualities in the realm of strength, resistance to deformation, resistance to fragmentation, and generally in the categories (a) to (g). Resistance to deformation is especially important as deformation leads to grave consequences, rupture of the tube, seizure of an element in the canal, sealing of the canal accompanied by fusion of the uranium and contamination of the reactor and its surroundings. The new fuel is superior in all these categories, eliminating or greatly reducing these difficulties, reducing the cost of manufacture, eliminating, or greatly reducing the frequency and cost of repairs, and minimizing or eliminating the redressing of fuel elements. Preliminary thermal treatments are eliminated.

Another advantage of the new fuels is that the prior alloying elements such as Mo absorb a substantial proportion of neutrons, for instance 1500 p.c.m. for an alloy U-Mo of 1.1% Mo, but if the same alloy receives an addition of the quantities of B or Be of this invention there is made available an additional release of neutronic energy of 600–700 mwj./t., on a total of from five to six thousand. This gain in neutronic energy amounts to about 40% in many cases. In one case it was possible to extract only 3500 mwj./t. (megawatt days per ton) without this invention and 6000 mwj./t. with the same fuel after the incorporation of the required amount of boron.

Another advantage is that, in cases where the major improvement is in one or not all of the categories, the others, operating satisfactorily, are not adversely affected.

A great number of alloys of uranium with tiny contents of alloying metals (less than 5%) have been tested (e.g. zirconium, niobium, aluminum, copper, nickel, tin, molybdenum, etc.), vanadium and zinc, proving the general beneficial effect of boron and beryllium, and leading to the conclusion that their action is specific to the uranium rather than dependent on the nature of the other alloying metal. The effect of the other metal in general remains undisturbed, if its effect has been beneficial, when the boron or beryllium is added. The multiplication of grains per unit volume occurs with pure uranium, with alloys of uranium containing only very small quantities of alloying metal, less than 5%, with alloys of metals having one or another beneficial effect on one of the categories, and with alloys of metals having no effect on the categories, being in effect inert. The limit on the content of alloying metal prevents them from violating the regions of stability of the $x$, $\beta$, and $y$ phases of the uranium. Although boron and beryllium accomplish the same result their progress toward that end is thought to involve differing phenomena.

The following example illustrates the invention:

GENERAL EXAMPLE

A selected quantity of uranium and molybdenum in finely divided form, for example 98.9 parts by weight of uranium and 1.1 part by weight of molybdenum are thoroughly mixed in the cold and heated until they are completely melted, for instance to 2,700° C. The melt is cooled to a temperature between 2,300° and 2,500° C. and 100 parts per million of boron are added with stirring to provide thorough intermixture. The melt is cooled to about 900° C. without control. Between 850° and 650° C. the alloy is cooled at a controlled rate for instance at 50° C. per minute. When 650° C. is attained the mass may be cooled rapidly or slowly as desired as the favorable qualities of the novel alloy have been established.

The following examples were carried out for comparative purposes and the drawings illustrate the improvements which have been attained.

Example 1

Using the technique described in the General Example an alloy of uranium and molybdenum containing 1.1% of molybdenum was produced by cooling from 850° to 650° C. at 15° C. per minute. The product had the grain shown in FIG. 1 at a magnification of 360×. Boron or beryllium were not added.

Example 2

An alloy otherwise identical with that of Example 1 was made with a content of 100 parts per million of boron. The operative conditions were otherwise identical. The grain structure at a magnification of 360× is shown in FIG. 2. Where FIG. 1 shows only 4 grains, FIG. 2 shows at least 40 in an identical area.

Example 3

The conditions of Example 1 were repeated but cooling was at 80° C. per minute. FIG. 3 shows the grain structure of the product at 360×

Example 4

Example 4 duplicates Example 2 except that cooling between 850° and 650° C was at the rate of 80° C. per minute. FIG. 4 shows the product at a magnification of 360×.

Example 5

An alloy of uranium and molybdenum containing 0.4% of molybdenum was made with cooling between 850° and 650° C. at 15° C. per minute. The grain structure is shown at a magnification of 180× in FIG. 5. Such a product cannot be considered useful.

Example 6

Figure 6:
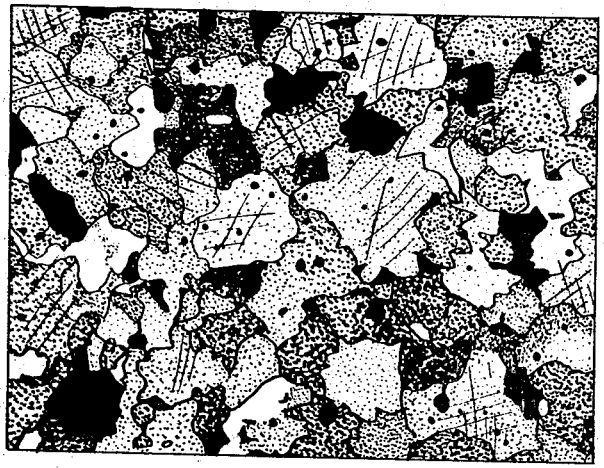

An alloy identical to that of Example 5 except for the addition of 100 parts per million of boron was made under identical conditions. Its grain structure is shown in FIG. 6 at a magnification of 180×. This is a very strong and highly useful alloy.

Example 7

The alloy was identical with that of Example 5 except that it was cooled in the range of 850° to 650° C. at 80° C. per minute. The enlargement is 180× in FIG. 7.

Example 8

Figure 8:

An alloy identical with that of Example 6 was made but it was cooled in the range of 850° to 650° C. at 80° C. per minute. FIG. 8 illustrates the grain size at a magnification of 180×.

Example 9

An alloy of uranium and molybdenum containing 1.1% of molybdenum was made with a content of 300 parts per million of beryllium under conditions identical with those of Examples 1 and 2. Cooling was at 15° C. per minute and the grain size was taken at an enlargement of 360×, appearing as in FIG. 9.

Example 10

An alloy identical with that of Example 9 was made and cooled at 80° C. per minute. The grain structure is represented in FIG. 10 at a magnification of 360×.

Example 11

Utilizing the technique of the general example with suitable adjustment of the melting temperature, an alloy of uranium with .4% Mo, 500 p.p.m. Al, 500 p.p.m. Sn, and 100 p.p.m. B was made, the grain pattern under microscopic examination proving to be very fine, in all ways comparable to that of FIGS. 2 and 10 depending on the cooling rate adopted in the controlled range. Sharp improvement in all categories, compared with the identical alloy without B or Be was obtained.

Example 12

Utilizing the technique of the general example with suitable adjustment of the melting temperature an alloy of uranium with .2% Mo. 1000 p.p.m. Al, and 100 p.p.m. B was made. The sharp improvement in the categories was obtained, flowing in large part from the minimization of crystal size and the multiplication of crystals per unit volume.

The new fuels have high specific power, relatively great strength, superior dimensional stability under operating conditions, low neutronic absorbtion, and relatively low cost.

When atomic fuels are made by a process which permits them to be shaped directly by pouring the uranium or the alloy containing uranium, it is very important that the primary grain, that is to say the grain observed during the solidification of the poured metal, before cooling below the temperature corresponding to the first transformation (called gamma grain), shall be as small as possible because, whatever may be the thermal treatment to which one ultimately subjects the poured bases, one can no longer improve the morphology and the homogeneity of the alpha structure even though the grain be refined.

In FIG. 1 is shown the gamma structure of a uranium alloy containing 1.1% of molybdenum after cooling at an average rate of 15° C. per minute between 850° and 650° C. The enlargement to 360× shows four different grains. Even if it does not show the whole of any of the four grains it allows one to attribute to each a linear dimension of about 1.5 mm. By adding 100 parts per million of boron to the same alloy (preferably boron 11 or a mixture of boron 10 and boron 11 in order to reduce the reactivity of the fuel), the product, without changing the speed of cooling, has a gamma grain of useful size as shown in FIG. 2. The grains are regular and their mean dimension is from 40 to 50 microns which imparts to the alloy good stability under the operative conditions of nuclear reactors. The improvement is substantial. This invention makes it possible to obtain bases which are substantially free of foundry defects directly by pouring the melt into hot molds. The process is notably successful in thus manufacturing tubular combustible elements.

The structural improvement which is achieved by the addition of boron is equally present when the alloy is cooled rapidly as shown in FIGS. 3 and 4 which correspond to average speeds of cooling of 80° C. per minute between 850° and 650° C. The two micrographs, FIG. 3 and FIG. 4, show that the grain is finer than that which can be obtained by the slow cooling of FIG. 1 and FIG. 2. The addition of the boron procures yet a further improvement in the fineness of the grains of which the mean dimension dropped from the 100–120 microns of FIG. 3 to the 20 microns of FIG. 4.

Figure 5:

The accomplishment of this invention are equally good in connection with other uranium alloys, for example alloys of lesser content of molybdenum. FIG. 5 shows a micrograph of an alloy of uranium and 0.4% molybdenum which was poured in a hot mold and cooled between 850° and 650° C. at an average of 15° C. per minute. The alpha grain is very large and of irregular contour so that the alloy is practically useless. On the contrary, the micrograph of FIG. 6 obtained under identical conditions but with the addition of 100 parts per million of boron produces a very fine but regular grain structure which makes that alloy perfectly useful for the manufacture of fuel for nuclear reactors.

Figure 7:

In FIG. 7 and FIG. 8, similar in general respects to FIGS. 5 and 6 except for speed of cooling, the respective grain sizes are substantially the same as those of FIG. 5 and FIG. 6. FIG. 7 shows that, for that alloy, the speed of cooling had little influence on the size and regularity of the grain which are comparable even at 15° C. per minute (FIG. 5) or 80° C. per minute. Both alloys are practically useless but with the addition of 100 parts per million of boron (FIG. 6 and FIG. 8) the grain is acceptable throughout the whole range of speeds of cooling from 15° C. to 80° C. per minute.

The boron which is added as described herein may make unnecessary the boron which has been added systematically to some fuels in the reactor to regulate their reactivity.

FIGS. 9 and 10 show the advantages of small additions of beryllium and may be compared to FIGS. 1 and 3 of identical enlargement, at like speeds of cooling in the range of control. The optimum proportion of beryllium to be used is higher than that of boron in the foregoing alloys but beryllium has only a small section of capture of neutrons and its addition does not noticeably modify the neutronic characteristics of the alloy. As its addition makes possible the use of alloys of 0.4% molybdenum, a substantial reduction of their usual content of 1.1%, it produces an improved rate of burn-up (combustion rate) of the combustible elements which may be measured by tens and even hundreds of megawatts per day per ton.

From the foregoing it will be perceived that the advantages of the invention are many and that the object of the process is to reduce the size of the alpha pseudo-grains which are stable at room temperature and that this is true for an extended range of speeds of cooling between the temperature of solidification and the temperature corresponding to the establishment of the phase which is stable at room temperature. A particular advantage is that the process allows slow cooling to be used for the production of small grain size and superior product. The process is applicable to uranium alone and to alloys of uranium and to alloys containing refiner metals, the purpose of which is to refine the structure of the alpha grain in a restricted range of cooling speeds. Contents of boron and beryllium may range between 5 and 2,000 parts per million with satisfactory results. When the nuclear fuels are shaped by pouring into the molds to obtain desired forms and dimensions, it is desirable to cool the mold at a speed less than 20° C. per minute between 850° and 650° C. The rates of cooling range in general between 15° and 100° C. per minute for alloys containing the known fining additives of the type of molybdenum, chromium, iron, silicon and germanium in the range between 5 and 2,000 parts per million.

As many apparently widely different embodiments of the present invention may be made without departing from the spirit and scope thereof, it is to be understood that the invention is not limited to the specific embodiments.

What is claimed is:

1. A method of multiplying the number and minimizing the size of the grains per cubic volume of a nuclear fuel comprising uranium, and of imparting thereto stable dimensions, which comprises melting the uranium of said nuclear fuel with between 5 and about 2000 parts per million of at least one of the elements boron and beryllium to form an alloy, and cooling the molten alloy in the range of temperature from about 850° to about 650° C. at a rate from about 15 to about 100° C. per minute.

2. A method according to claim 1 in which the cooling rate is from about 20 to about 80° C. per minute.

3. A method according to claim 2 in which the nuclear fuel is an alloy of uranium with the addition of a grain refining element.

4. A method according to claim 2 in which the nuclear fuel comprises uranium and an inert, alloying metal other than boron or beryllium.

5. A method according to claim 4 in which the nuclear fuel comprises uranium and an alloying metal selected from the group consisting of zirconium, niobium, aluminum, copper, nickel, tin, molybdenum, vanadium and zinc.

6. A method according to claim 2 in which the nuclear fuel comprises a grain refining element and an inert metal other than boron or beryllium.

7. A method according to claim 6 in which the nuclear fuel includes molybdenum as a grain refining element, in an amount between 0.4 and 5.0% by weight, and an inert metal other than boron or beryllium.

8. A method according to claim 3 in which the grain refining element is a metal selected from the group consisting of molybdenum, chromium, aluminum, iron, nickel, silicon, titanium, germanium and yttrium, and does not exceed 5% of the weight of the nuclear fuel.

9. A nuclear fuel comprising an alloy having uranium as its essential fissionable ingredient and alloyed with between 5 and 2000 parts per million, of at least one of the elements boron and beryllium, said fuel having the grain structure and size produced by cooling the alloy from its molten state, in the range about 850° C. to 650° C., at a controlled rate of from about 15° C./min. to about 80° C./min.

10. The nuclear fuel of claim 9, in which the uranium is also alloyed with a grain fining element selected from the group consisting of molybdenum, chromium, aluminum, iron, nickel, silicon, titanium, germanium and yttrium.

11. A nuclear fuel according to claim 10 in which the grain fining element is Cr.

12. A nuclear fuel according to claim 10 in which the grain fining element is Si.

13. A nuclear fuel according to claim 10 in which the grain fining element is about 0.2% to 1.1% by weight of Mo.

14. A nuclear fuel according to claim 10 in which the grain fining element is Fe.

15. A nuclear fuel according to claim 10 in which the grain fining element is Ge.

16. A nuclear fuel according to claim 9 in which the grains of the alloy are about 20–50 microns in size.

17. The method of producing a fine-grained nuclear fuel comprising, melting together about 98 to 99% by weight of uranium, with about 1 to 2% of molybdenum, at a temperature above about 2500° C., to form an alloy, cooling the melt to between about 2300° C. and 2500° C., adding to the melt 100 to 300 p.p.m. of an element selected from the group consisting of boron and beryllium, cooling the melt to about 850° C. at a desired rate, cooling the melt from 850° C. down to about 650° C. at a controlled rate of from 15° C./min. to 80° C./min., and cooling the melt from about 650° C. at a desired rate.

18. The method of claim 17, said rate of cooling from about 850° C. down to about 650° C. being at a rate of about 15° C./min. to 20° C./min.

References Cited

UNITED STATES PATENTS

| | | | |
|---|---|---|---|
| 2,919,186 | 12/1959 | Colbeck | 75—122.7 |
| 2,920,025 | 1/1960 | Anderson | 75—122.7X |
| 2,951,801 | 9/1960 | Lillie | 75—122.7X |
| 2,967,812 | 1/1961 | Thurber | 75—122.7X |
| 3,109,730 | 11/1963 | Zegler | 75—84.1 |
| 3,258,333 | 6/1966 | Aubert | 75—122.7 |
| 3,285,737 | 11/1966 | Bellamy | 75—122.7 |
| 3,331,748 | 7/1967 | Feraday | 75—122.7X |
| 3,343,947 | 9/1967 | Fizzotti et al. | 75—122.7 |
| 3,361,857 | 1/1968 | Rose | 176—89X |

OTHER REFERENCES

Nuclear Science Abstracts, vol. 18, No. 6, Mar. 31, 1964. Abstract No. 8726, p. 1177.

Nuclear Science Abstracts, vol. 19, No. 15, Aug. 15, 1965. Abstract No. 28,777, p. 3567.

Reactor Core Materials, vol. 4, No. 1, Feb. 2, 1961, p. 3.

Reactor Handbook, vol. 1, June, 1960, p. 154.

CARL D. QUARFORTH, Primary Examiner

A. J. STEINER, Assistant Examiner

U.S. Cl. X.R.

75—122.5; 176—89; 252—301.1